May 1, 1928.

L. J. HOMAN, JR 1,667,802

FOOT GAUGE

Filed May 23, 1927

Inventor
Louis J. Homan Jr.

By Wood & Wood Attorneys

Patented May 1, 1928. 1,667,802

UNITED STATES PATENT OFFICE.

LOUIS J. HOMAN, JR., OF CINCINNATI, OHIO.

FOOT GAUGE.

Application filed May 23, 1927. Serial No. 193,543.

This invention relates to devices for gauging the human foot to determine the requisite width or size of the appropriate shoe.

The object of the invention is to provide a gauge for determining the width size of the shoe appropriate for the foot gauged.

Other objects and certain advantages of the invention will be more fully set forth in the description of the accompanying drawings, forming a part of this specification in which.

Figure 1:
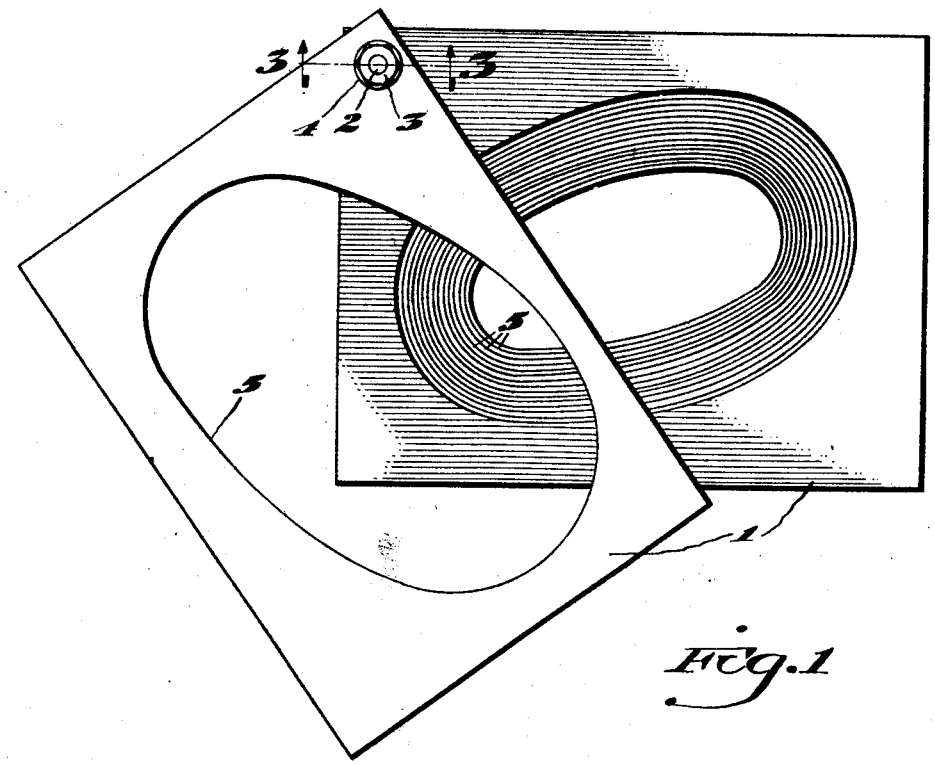
Figure 1 is a plan view of the gauge showing one of the leaves thereof swung away from the remainder.
Figure 2:
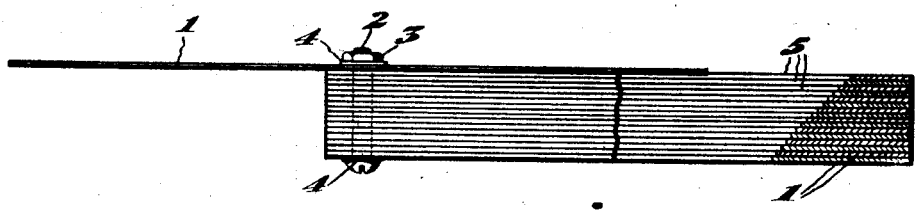
Figure 2 is a side view of Figure 1 with the portion at one end thereof broken away to show the graduated arrangement of the apertures in the leaves.
Figure 3:
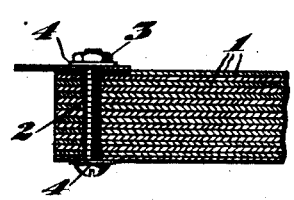
Figure 3 is a sectional view taken on line 3—3, Figure 1, detailing the construction of the pivot holding the leaves together.

The gauge comprises a plurality of leaves each differently apertured, said leaves associated to provide a gauge adapted to determine relative foot widths.

More specifically, a plurality of leaf elements 1 are pivoted together compactly in superposed relationship by a screw 2 having a nut 3 on one end thereof to hold the leaves on said screw. Washers 4 are used between the leaves and the screw head and between the leaves and the nut. The leaves are preferably made of cardboard fibre, or some similar sheet material. Sheet metal can be used if desired.

Each leaf is provided with an ovel shaped aperture 5 adapted to fit over the foot at the ball. As disclosed, the apertures are disposed with the long axis on an angle to the edge of the leaves. Each leaf is provided with an aperture of a different size, said sizes corresponding to the various shoe widths. The apertures are graduated in size from one side of the gauge to the other so that the leaves are serially disposed in relation to the shoe sizes which they indicate.

In use the salesman or person measuring the foot places one leaf after another over the foot until one leaf goes over the ball of the foot. The leaf going over the ball of the foot indicates the correct width number. A gauge of this type can also be used to determine relative arch data.

It is not necessary that the leaves bear the shoe number, but the leaves are preferably numbered serially and the shoe salesman or manufacturer co-relates the serial number and the shoe width.

Having described my invention, I claim:

A gauge for determining the width of shoe appropriate for a foot, said gauge comprising, a plurality of leaves compactly pivoted together, each leaf provided with an aperture elongated to fit over the ball of the foot to be measured, said apertures graduated serially as to size.

In witness whereof, I hereunto subscribe my name.

LOUIS J. HOMAN, JR.